Patented May 7, 1946

2,399,655

UNITED STATES PATENT OFFICE 2,399,655

RUBBER ACCELERATOR

William H. Alton, Westport, Conn., assignor to R. T. Vanderbilt Company, Incorporated, New York, N. Y., a corporation of New York No Drawing. Original application June 20, 1938, Serial No. 214,728. Divided and this application October 2, 1940, Serial No. 359,451

2 Claims. (Cl. 260—779)

This invention relates to improvements in rubber accelerators and it provides improved compositions of such materials which are readily dispersible in water.

The new compositions are made by adding bentonite to the rubber accelerators before they are subjected to drying in the final stage of their manufacture, the bentonite-treated compositions then being dried to produce the new products of the invention.

Rubber accelerators which are precipitated while in extreme fine-particle size in themselves, tend to form agglomerates or bunches during the drying process, which agglomerates do not subsequently disperse freely or completely, requiring in many instances to be further ground before a complete dispersion can be had. This grinding operation is usually carried out in either colloid mills or pebble mills and may require hours of grinding, thereby delaying production and requiring extra equipment and treatment in addition to the ordinary mixing when compounding with other ingredients. Many of the chemicals used in compounding rubber must be mechanically dispersed when used in conjunction with rubber latex.

I have discovered that precipitated rubber accelerators can be prevented from adhering to form aggregates on drying by intimately mixing bentonite with the precipitated rubber accelerator while in the paste stage, so as to surround each particle of accelerator with the bentonite and so that when dried the particles will be coated with bentonite as an insulating material which prevents the formation of aggregates.

Commercial bentonite often contains a considerable amount of very fine grit, varying in amount, and this grit may be objectionable in the rubber accelerator compositions. A grit-free bentonite can readily be prepared by subjecting an aqueous slurry or suspension of the bentonite containing from around 4 to 15% or more of solids to centrifugal separation, using a centrifugal force ranging from about 400 to 1500 times the force of gravity, this method being described in my prior appplication Serial No. 174,859. Bentonite can also be substantially freed from grit by diluting it with water to a sufficient extent to permit the gritty or abrasive matter to settle. The nearly pure bentonite obtained in this way or by centrifugal separation of the grit is then thickened or completely dried before use.

In using the term bentonite I include the various different kinds of bentonite and the different silicates having a characteristic colloidal or plastic nature and belonging in general to the Montmorillonite group of minerals, including the aluminum silicates or bentonites, the magnesium silicates or bentonites, the calcium-magnesium silicates or bentonites, etc., these minerals being generally silicates of aluminum or silicates of magnesium or calcium, or of magnesium and calcium, of the characteristic colloidal character.

In carrying out the process and in producing the new compositions the rubber accelerator is produced by precipitation and after washing, if necessary, to remove excess of reagents, etc., and while in a wet state, i. e., in the form of a paste, the bentonite is added and thoroughly incorporated therewith.

The amount of the bentonite added can be varied over a considerable range or proportion. The amount may range, for example, from around 4% of the rubber accelerator up to around 50%. The bentonite can be added either dry or as an aqueous paste. Its nature is such that even a relatively small amount is effective in coating or surrounding the individual particles of the accelerator so that the particles do not undergo objectionable aggregation on drying.

After admixture of the bentonite with the precipitated rubber accelerator the composition is dried. The temperature of drying will vary somewhat with the nature of the rubber accelerator.

The dried rubber accelerators have the advantage that they do not need grinding to effect their dispersion, but can be readily dispersed by simple mixing with the vehicle or even by soaking followed by stirring and without the formation of aggregates.

The invention will be further illustrated by the following example:

*Example—Rubber accelerators.*—Various rubber accelerators, for example butyl zimate (zinc dibutyldithiocarbamate) are not normally dispersible in water without special treatment, e. g., by adding casein together with an alkali, and grinding the whole in a pebble mill from 12 to 24 hours. If, however, a bentonite slurry is incorporated with the accelerator in the proportions of 3 to 25% solids before the accelerator is dried, and the two are dried together in the final stage of manufacture, the accelerator will be readily dispersible in water by adding a small quantity of water to the dry powder and rubbing or mixing into a smooth paste, and thereafter adding water slowly while stirring until the desired consistency is reached.

The methods of precipitating or otherwise preparing the rubber accelerators have not been described. In general the bentonite is added to these materials at a stage where they would otherwise be ready for drying while they are still in a wet state, e. g., in the form of a slurry or filter cake.

This application is a division of my copending application Serial No. 214,728, filed June 20, 1938.

I claim:

1. A new composition comprising essentially a rubber accelerator admixed with bentonite, said composition being dry and resulting from the forming of a wet admixture of bentonite with the rubber accelerator in the wet state before drying.

2. New compositions comprising essentially a rubber accelerator admixed with bentonite, said compositions being dry and resulting from the forming of a wet admixture of bentonite with an organic rubber accelerator in the wet state before drying.

WILLIAM H. ALTON.